2,822,388
PROCESS FOR SEPARATING CRUDE MIXTURES OF TEREPHTHALIC ACID AND PARA-TOLUIC ACID

Otto Horn, Frankfurt am Main, and Helmut Jockusch, Bad Soden, Taunus, Germany, assignors to Farbwerke Hoechst Aktiengesellschaft vormals Meister Lucius & Bruning, Frankfurt am Main, Germany, a corporation of Germany No Drawing. Application March 12, 1956
Serial No. 570,672

Claims priority, application Germany March 25, 1955

8 Claims. (Cl. 260—525)

The present invention relates to a process for separating crude mixtures of terephthalic acid and para-toluic acid.

Various processes have already become known which disclose the purification of terephthalic acid. These processes, however, do not yield pure terephthalic acid free from para-toluic acid or are very complicated. Thus, for example, it has already been proposed to carry out a sublimation in an oil suspension with the use of a thin layer evaporator. According to other known processes, the crude acid which still contains para-toluic acid is extracted with a hot solvent, for example, methanol, ethanol, acetone or xylene. Furthermore, it has already been proposed to use xylene at a raised temperature with application of pressure.

By using these solvents the solubility of the terephthalic acid increases with the increasing temperature so that always a considerable portion of said acid is likewise dissolved. Hence a mixture of terephthalic acid and para-toluic acid is always obtained from the dissolving phase. Apart from the minor solubility differences of these two acids in the aforesaid solvents, the known processes involve the disadvantage to yield terephthalic acid in a purity of only 91 to 95%.

Experiments have shown, for example, that 50 parts by weight of a mixture consisting of 91 percent by weight of terephthalic acid and 9 percent by weight of para-toluic acid when boiled for 3 hours with 475 parts by weight of acetone and when subsequently subjected to filtration in the hot, yield 48.4 parts by weight of an acid mixture of the acid number 663 (corresponding to terephthalic acid of 95.2 percent strength) and 1.4 parts by weight of a para-toluic acid of the acid number 413.

Now we have found that acetonitrile can be used with particular advantage for separating terephthalic acid and para-toluic acid, this being surprising. In this solvent terephthalic acid is completely insoluble even at the boiling point, whereas para-toluic acid is entirely dissolved out. Hence it is possible in an industrially simple manner to separate the mixture of terephthalic acid and para-toluic acid which is obtained in the industrially important oxidation of para-xylene and para-cymene into completely pure components with the aid of acetonitrile. The solubility of para-toluic acid in aceto-nitrile amounts at 20° C. to 2.96 grams in 100 grams of solution
82° C. to 12.4 grams in 100 grams of solution Hence the temperature coefficient of solubility is so high as to enable toluic acid to be completely removed from terephthalic acid by filtration of the aceto-nitrile solution in the hot.

The separation of the mixtures can be effected by simple dissolution or by continuous extraction. It is, however, particularly advantageous to use hot, for example, boiling aceto-nitrile. If desired, the extraction temperature may be increased by application of pressure; such application of pressure can however be dispensed with on account of the good solubility of para-toluic acid in acetonitrile, especially in hot acetonitrile, and, generally, involves no advantage because of the additional technical apparatus required.

It has already been proposed, to free terephthalic acid from toluic acid by washing with water at a temperature between 100 and 200° C. with application of pressure, filtering off the dissolved terephthalic acid, washing it with water near the critical temperature, dissolving the undissolved terephthalic acid in an alkali hydroxide solution and acidifying the solution obtained.

As compared therewith, the process of extracting para-toluic acid using acetonitrile, which can be carried out at a considerably lower temperature and under normal pressure, constitutes a valuable advance in industry, since terephthalic acid can be obtained by simple extraction without recrystallization.

The following examples serve to illustrate the invention but they are not intended to limit it thereto, the parts being by weight unless otherwise stated and the relationship of parts by weight to parts by volume being the same as that of the kilogram to the litre:

Example 1

10 parts of a mixture of acids of the acid number 652 (corresponding to 91 percent by weight of terephthalic acid and 9 percent by weight of para-toluic acid) which mixture has been prepared by precipitation of a solution of alkali salts with mineral acid, are boiled under reflux with 94 parts (=120 parts by volume) of acetonitrile. 9.1 parts of undissolved terephthalic acid of the acid number 677 (theoretical acid number 675) remain behind; on cooling the solution so obtained, 0.4 part of pure toluic acid of the acid number 414 crystallize out (theoretical acid number 412).

If the process is started from a mixture containing toluic acid in a greater proportion and a too small amount of acetonitrile is used the toluic acid is not removed in one operation; however, in this case too pure para-toluic acid is isolated from the dissolved phase.

Example 2

From 10 parts of a mixture of the acid number 602, corresponding to 72 percent by weight of terephthalic acid, which mixture has been prepared as described in Example 1, there are obtained by boiling with 120 parts by volume of boiling acetonitrile 1.7 parts of toluic acid of the acid number 415 (calculated for 412) and 8.3 parts of a mixture of acids of the acid number 630 (corresponding to 83 percent by weight of terephthalic acid).

By again extracting the mixture of acids with 120 parts by volume of acetonitrile there are obtained 7.1 parts of terephthalic acid of the acid number 676 whereas 1 part of toluic acid of the acid number 413 remains in the solution on evaporation.

We claim:

1. A process of separating a mixture of terephthalic acid and para-toluic acid which comprises contacting the mixed acids with aceto nitrile and separating the resulting solution from the residue.

2. A process of separating a mixture of terephthalic acid and para-toluic acid which comprises contacting the mixed acids with boiling aceto nitrile and separating the resulting solution from the residue.

3. A process of separating a mixture of terephthalic acid and para-toluic acid which comprises contacting the mixed acids with aceto nitrile under atmospheric pressure and separating the resulting solution from the residue.

4. A process of separating a mixture of terephthalic acid and para-toluic acid which comprises contacting the mixed acids with aceto nitrile under superatmospheric pressure and separating the resulting solution from the residue.

5. A process of separating a mixture of terephthalic acid and p-toluic acid which comprises extracting p-toluic acid with acetonitrile from the mixture and separating the resulting solution from the residue.

6. A process of separating a mixture of terephthalic acid and p-toluic acid which comprises extracting p-toluic acid with acetonitrile from the mixture at room temperature and separating the resulting solution from the residue.

7. A process of separating a mixture of terephthalic acid and p-toluic acid which comprises extracting p-toluic acid with acetonitrile from the mixture at elevated temperature and separating the resulting solution from the residue.

8. A process of separating a mixture of terephthalic acid and p-toluic acid which comprises extracting p-toluic acid with acetonitrile from the mixture at boiling temperature under pressure and separating the resulting solution from the residue.

References Cited in the file of this patent
UNITED STATES PATENTS

| | | |
|---|---|---|
| 2,572,575 | Shafer et al. | Oct. 23, 1951 |
| 2,572,710 | Emerson et al. | Oct. 23, 1951 |
| 2,636,899 | Burrows et al. | Apr. 28, 1953 |

OTHER REFERENCES

Scheflan et al.: The Handbook of Solvents, pp. 87–88 (1953).